UNITED STATES PATENT OFFICE.

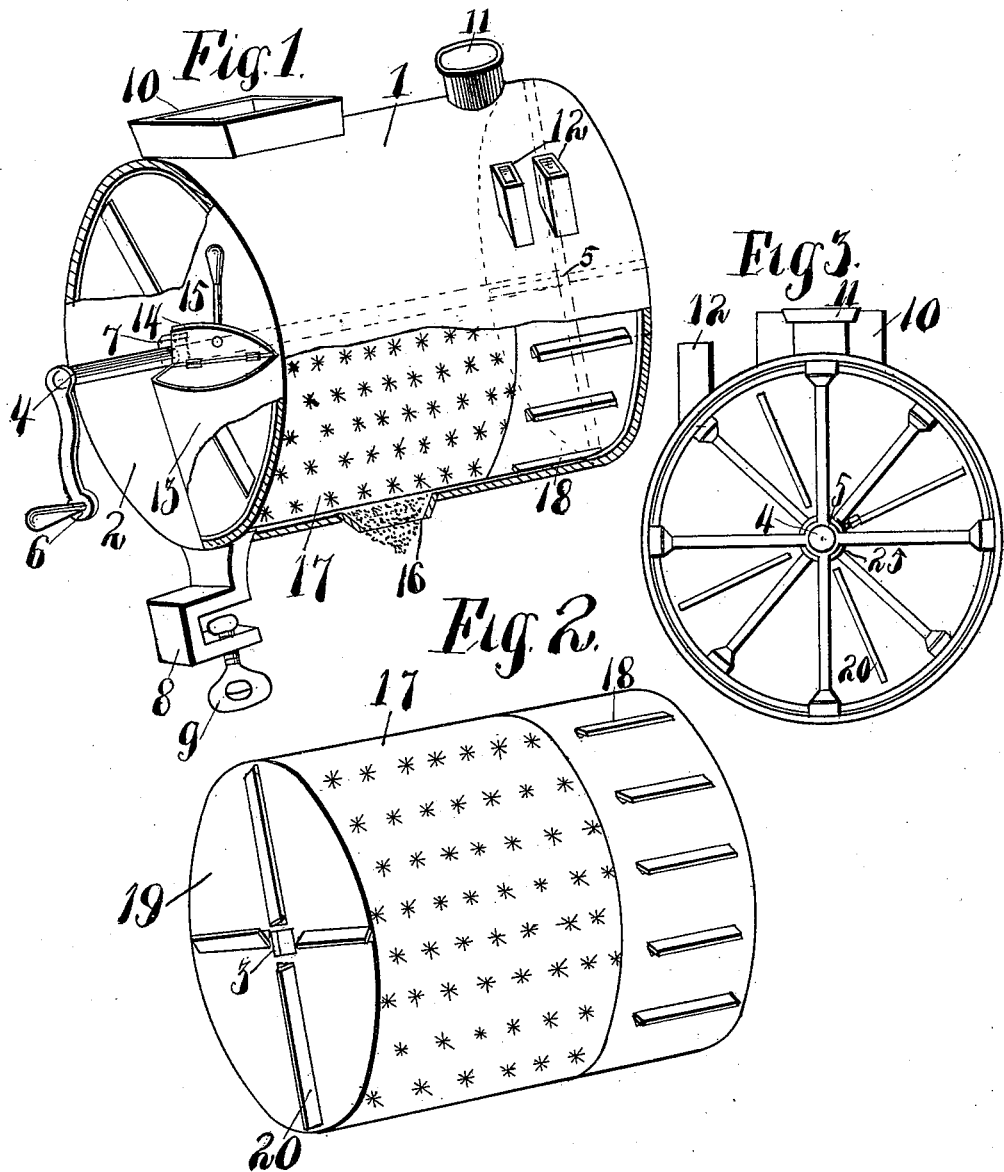

THEODOR MENZE, OF ST. LOUIS, MISSOURI.

DEVICE FOR SLICING AND GRATING VEGETABLES.

SPECIFICATION forming part of Letters Patent No. 463,525, dated November 17, 1891.

Application filed June 29, 1891. Serial No. 397,845. (No model.)

*To all whom it may concern:*

Be it known that I, THEODOR MENZE, a resident of the city of St. Louis, in the State of Missouri, have invented certain new and useful Improvements in Devices for Slicing and Grating Vegetables, of which the following is a full, clear, and exact description, reference being had to the accompanying drawings, forming a part hereof.

My invention relates to improvements in devices for slicing and grating vegetables; and it consists in the novel arrangement and combination of parts, as will be more fully hereinafter described, and designated in the claims.

In the drawings, Figure 1 is a perspective view of my complete invention with parts of the outer shell or casing broken away, and Fig. 2 is a perspective view of the inner shell or casing, or the one that is provided with a roughened surface and also a series of knives for slicing vegetables. Fig. 3 is a rear end view of my invention, showing the bearings of the outer shell and the inner rotating shell.

The object of my invention is to construct a device or machine for slicing and grating potatoes, also for slicing cucumbers and beans and for grating and slicing various other vegetables too numerous to mention.

I will give a further description of the object of my invention in connection with a mechanical description of the same.

Referring to the drawings, 1 indicates the outer shell or casing, the same being provided with partially-closed end 2, with an angular bearing-hole 3 for an operating-shaft 4 formed therein. Said bearing-shaft 4 is located in bearing-hole 3, and the other end of the same is also located in any suitable and mechanical bearing secured to said shell or casing 1, such as 5. (Shown in dotted lines in Fig. 1 and in solid lines in Fig. 3.) Said shaft 4 is revolubly mounted in bearings 3 and 5 and is adapted to be rotated by means of a crank-arm 6. Mounted on said shaft 4 is a collar 7, which holds said operating-shaft 4 in its desired adjustment.

8 indicates a clamp which is secured to the outer shell or casing 1 in any suitable and mechanical manner. Said clamp 8 is provided with a thumb-screw 9. The clamp or cleat 8 is adapted to be inserted or placed on the edge of the table or any other desired support and secured thereto by means of thumb-screw 9. Said outer shell or casing 1 is provided with a hopper 10, in which the potatoes may be placed when it is desired to grate the same, with a hopper 11 for the reception of cucumbers whenever it is desired to slice the same, with two hoppers 12 for the insertion of beans whenever it is desired to slice the same, and with a receptacle 13 formed in the end 2 for the insertion of potatoes whenever it is desired to slice the same. Said receptacle 13 is provided with a hinged lid 14 for closing the same. Secured to said lid 14 is a handle 15 to apply pressure to said lid, for the purpose that will be more fully hereinafter described. Said outer shell or casing 1 is provided with an exhaust-orifice 16, formed in the bottom thereof for the passage of the grated substance.

Having given a description of the outer mechanism, I will now proceed to describe the inner shell 17. Said shell 17 is provided at one end with a roughened surface suitable for grating and at the other end with a series of knives 18, formed direct from said shell or casing. Said inner shell 17 has a closed end 19 and the opposite end of said shell is open, so as to permit the insertion of the hand for removing the sliced substance. Said end 19 is provided with a series of radial knives 20, which are formed direct from the metal which closes said end. The knives 18 and 20 point or slant in the same direction. The inner shell 17 is rigidly mounted on the operating-shaft 4 in any suitable and mechanical manner and is adapted to turn freely within the outer shell 1.

Having given a description of the mechanical parts of my invention, I will now proceed to describe the operation and use of the same. For instance, if it is desired to slice the potatoes the operator should place the potatoes in receptacle 13, which communicates with the inside of the outer shell 1. By so placing the potatoes in said receptacle they are brought in contact with the closed end 19 of the inner shell 17, and by the rotation of said inner shell 17 by means of a crank 6 the knives 20 will come in contact with the potatoes and consequently slice the same, the slices thereof falling on the inner side of the inner shell 17 through the openings formed by stamping knives 20 direct from the end 19. By applying pressure to lid 14 by means of handle 15 said lid may be pressed downwardly upon the potatoes and hold the same firmly in contact with the end 19, thereby making the potatoes subject to the action of the knives 20. For instance, if it is desired to grate the potatoes the operator should place the same in hopper 10, thereby letting the same come in contact with the roughened surface of the inner shell 17, and by rotating said shell in the manner as hereinbefore described the grating of the potatoes may be effected and the grated substance will find an exit through the exhaust-orifice 16. If it is desired to slice cucumbers, the operator should place the same in hopper 11 and the knives 18 will slice the same. The sliced particles thereof will accumulate upon the inside of the inner shell 17 and from thence can be removed. If it is desired to slice beans, the operator should place the same in the hoppers 12 and the knives 18 will effect the desired slicing, the sliced particles thereof accumulating upon the inner side of the shell 17, and from thence can be removed as desired. It may be premised in this connection that the knives 18 are formed circumferentially on end of the inner shell 17, and that the knives 20 are radially formed on the closed end 19, all of said knives being stamped out or formed directly from the metal embodied in said shell. It may also be noted in this connection that the open end of the inner shell 17 is provided with any suitable bearing—such as 25—for the operating-shaft 4, (said bearing, however, being illustrated in Fig. 3;) also, that the knives 20 are located at right angles relative to each other.

Having fully described my invention, what I claim is—

1. In a vegetable-cutter, the combination, with a cylinder or casing having bearings in the end thereof and hoppers on the upper side and end of said casing, of a second cylinder mounted in said bearings and devices on the end and sides of the same to reduce the vegetables to small pieces, substantially as described.

2. In the herein-described device for slicing vegetables, an outer casing and an inner rotating shell 17, provided with a series of circumferential knives 18 and a series of radial knives 20, substantially as set forth.

3. In the herein-described device for slicing vegetables, an outer casing and an inner rotating shell 17, provided with a series of circumferential knives 18 and with a series of radial knives 20, located at right angles relative to each other, substantially as set forth.

4. The combination of an outer shell or casing 1, provided with hoppers 11 and 12 and a receptacle 13 for the insertion of vegetables, a lid 14, adapted to close said receptacle, an inner rotating shell 17, provided with a series of circumferential knives 18 and with a series of radial knives 20, an operating-shaft 4, on which said shell 17 is rigidly mounted, said shaft revolubly mounted in suitable bearings in the outer shell or casing 1, a clamp or cleat 8, provided with a thumb-screw 9 for securing said outer shell 1 to any desired support, and a crank 6 for rotating said shaft and consequently the inner shell 17, substantially as set forth.

In testimony whereof I affix my signature in presence of two witnesses.

THEODOR MENZE.

Witnesses:
ED. E. LONGAN,
L. L. TRACEY.